Sept. 6, 1966 A. J. MEYER, JR 3,270,503
ABLATION STRUCTURES
Filed Jan. 13, 1965 3 Sheets-Sheet 1
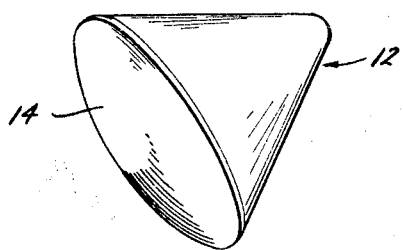
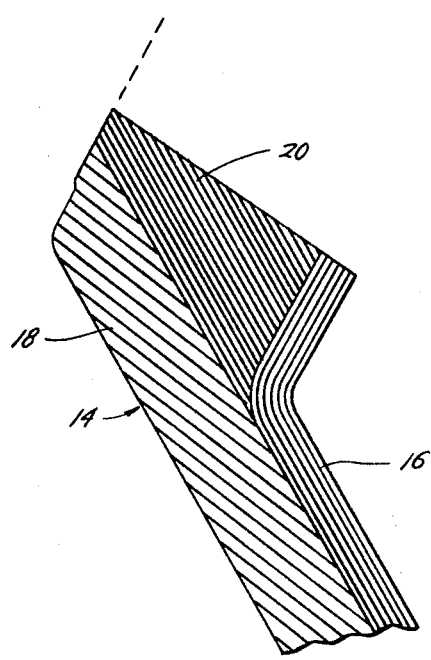
FIG. 2 PRIOR ART
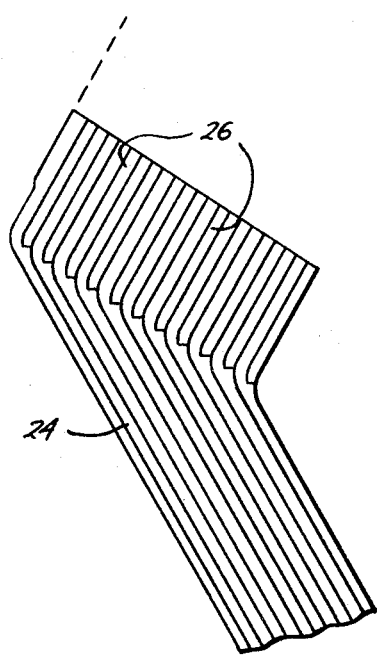
Andre J. Meyer, Jr.
INVENTOR.
BY
ATTORNEYS Sept. 6, 1966 A. J. MEYER, JR 3,270,503
ABLATION STRUCTURES Filed Jan. 13, 1965 3 Sheets-Sheet 2

Andre J. Meyer, Jr.
INVENTOR.

BY
ATTORNEYS

Andre J. Meyer, Jr.
INVENTOR.
ATTORNEYS

United States Patent Office 3,270,503
Patented Sept. 6, 1966

3,270,503
ABLATION STRUCTURES
Andre J. Meyer, Jr., Houston, Tex., assignor to the United States of America as represented by the Administrator of the National Aeronautics and Space Administration
Filed Jan. 13, 1965, Ser. No. 425,364
6 Claims. (Cl. 60—35.6)

The invention described herein may be manufactured and used by or for the Government of the United States of America for governmental purposes without the payment of any royalties thereon or therefor.

This invention relates in general to thermal protection and, more particularly, to ablative materials subjected to high heating rates for relatively short periods of time.

Conventional ablative materials are a composite of resins reinforced with Fiberglas, asbestos, or other refractory fibers in the form of either random or oriented fibers, or in the form of a tape, ribbon, cloth, or felt, etc. The success of such ablative materials resides in the fact that (1) they can withstand high heating rates; (2) they can dispose of a large amount of heat for a small amount of material loss; and (3) the low conductivity of the material retards heat transfer.

In the operation of a resin reinforced fiber type material, several zones are formed during the ablative process. The lowest zone, that is, the zone furthest away from exposure to the source of heat, is the virgin material. Above the virgin material there is a pyrolysis zone in which the resin starts to pyrolyze and form a char, which accumulates to form a zone which is retained by the reinforcing material. Within the char conduction of heat inwards toward the pyrolysis zone is partly offset by the transpiration of gases outward toward the surface, and the subsequent introduction of these relatively cool gases into the external flow provides film cooling at the exposed surface. Since the char has a high carbon content, it can sustain high surface temperatures and radiate an appreciable amount of heat. Moreover, since pyrolysis takes place at a relatively low temperature, little conduction of heat takes place within the virgin material.

Heretofore such ablative materials have been arranged in the form of laminations which were laid out either parallel, perpendicular, or sloped with regard to the direction of fluid flow. However, there is a tendency for cracks to develop between such laminations due to the transpiration of gases outward to the surface during the ablative process. The cracks between the laminations form relatively short paths through the wall of the ablative material along which heat can penetrate and rapidly conduct to the interior of the body which is intended to be protected. Such cracks, of course, can also cause structural failure of the material.

Another arrangement of ablative material has been a resin bonded Fiberglas honeycomb filled with low density, high performance ablative material. Surfaces to be protected against high heating often incorporate curvatures in two directions and, in some instances, the radii of curvatures are relatively small. Because of the anticlastic nature of the honeycomb material, fabrication difficulties are encountered in trying to form honeycomb cell material over relatively small radii of curvatures, particularly when the body to be covered has a bidirectional curvature. This difficulty increases as the thickness of the honeycomb material increases.

In order to overcome the attendant disadvantages of prior art ablative structures, the ablative material of the present invention permits outgassing to occur while simultaneously minimizing cracking between parallel laminations. Further, even if cracking did occur, the resultant paths would not provide paths for the heat to penetrate the body and would not be structurally degrading.

More specifically, according to one embodiment of the invention the ablative material is secured to the forebody of a space vehicle where the greatest amount of heat will be transferred to the vehicle upon entry of the vehicle into a planetary atmosphere. The ablative material is formed of a loosely woven cloth in the form of a mesh or screen with sizable voids between the threads of a cloth. These voids permit the heat shield to be built up of simple parallel laminates, and permit ablative outgassing without delamination of the parallel laminates. Because of the loose weave of the cloth, it can be stretched over mandrels with curvatures in two directions, or mandrels of relatively small radii of curvature. Sufficient resin is applied between the sheets of cloth so that the final assembly attains a high solidity. The porosity of the mesh or screen permits venting of the ablative gases, thus eliminating delamination of the laminated layers. In an alternate embodiment the ablative material is used as the body of a rocket engine. The material is built up into a body of revolution by laminating the layers together to form the approximate shape of the rocket body.

The advantages of this invention, both as to its construction and mode of operation, will be readily appreciated as the same become better understood by reference to the following detailed description when considered in connection with the accompanying drawings in which like reference numerals designate like parts throughout the figures, and wherein:

FIG. 1 is a perspective view of a space vehicle embodying the novel heat shield in accordance with this invention.

FIG. 2 is a side view in section of the prior art arrangement of the heat shield.

FIG. 3 is a side view in section, depicting the heat shield of FIG. 1.

Figure 4:
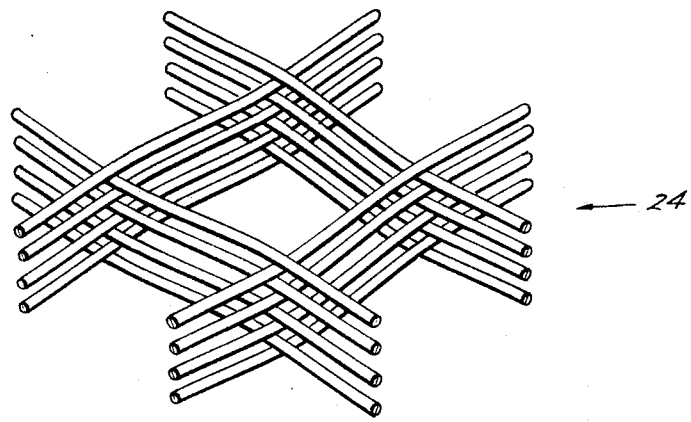
FIG. 4 is a perspective view of an embodiment of a portion of the material used in the heat shield of FIG. 3.

Referring now to the drawings, there is shown in FIG. 1 a space vehicle 12 having a heat shield 14 mounted on the forebody of the vehicle where the greatest amount of heat is transferred to the vehicle.

One type of heat shield previously used on a spacecraft is shown in greater detail in FIG. 2 and comprises laminated layers 16 of ablative material which are secured to the bulkhead of the spacecraft. Extending outwardly from the layers 16 are ablative members 18 which are secured to the layer 16, and are arranged in shingle fashion at an angle to the exposed surface. Further, a layer 20 of ablative material formed in a ring shape around the spacecraft is secured between the outer shingles and the portion of the layer 16.

When a space vehicle having the heat shield of FIG. 1 enters an atmosphere, the heat generated by the high reentry velocities is transferred to the heat shield and the ablative material is heated. When ablation has started, large volumes of gas are generated within the ablative material. The shingle construction of the heat shield allows these gases to be vented between the adjacent plies. The shingle arrangement of FIG. 2 requires large quantities of labor, special tooling, and poses certain fabrication problems caused by wrinkles forming when the entire heat shield assembly is compacted and used. Further, should the rate of gas generation exceed certain limits, blisters would form between adjacent shingles, due to the large volumes of gas attempting to vent outwardly. Such bubbling could result in structural failure.

Referring now to FIG. 3 there is depicted a preferred embodiment of the heat shield in accordance with this invention. The heat shield comprises a coarse weave Fiberglas or similar reinforcing material 24. As shown in FIG. 4, the material 24 is built up into successive layers until the desired thickness of the heat shield is obtained. Normally, the spacing between adjacent threads is several times the size of the individual threads. The cells form between the adjacent threads and plies. It is not essential that the grids formed by the threads of each layer be superimposed upon the preceding grid. Although the layers can be superimposed by using special holding techniques, the grids can also be alternated or displaced relative to each other and still provide reinforcing requirements for the ablative material. Once the cells are built up to the desired thickness, the cells thus formed are filled with ablative material and the ablative material in the individual cells is bonded together by the seepage of the ablative material between the layers. Vacuum techniques can be used to fill voids formed by the ablative material.

Figure 5:
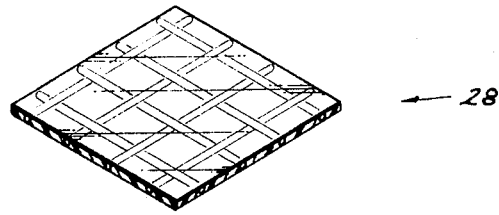
FIG. 5 is a perspective view of an alternative embodiment of the material used in the heat shield of FIG. 3.

Referring now to FIG. 5, there is shown an alternative type of material which may be used in the embodiment of FIG. 3. Layers of material 28, a typical one of which is shown in FIG. 5, may be made of a loose weave material which has been pre-impregnated with an ablative resin. The layers are built up to the desired thickness as in the embodiment of FIG. 4, and shaped and heated so that a unitary structure is formed.

The two types of ablative material are then easily shaped to the desired form as shown in FIG. 3. Due to the flexibility of the material, large amounts of curvature in a multiplicity of directions may be formed. Further, at the ends of the material 24, reinforcing tape 26, also formed of ablation material, may be added to form a structural member which may be easily secured to the spacecraft.

Upon heating of the ablative material of FIG. 3, due to the porosity of the mesh material, outgassing occurs without the accompanying delamination which occurs in the prior art shingle arrangement or normal weave parallel laminates. Further, the material may be easily shaped where the area to be protected has a radius of curvature, unlike the prior art honeycomb ablation heat shields.

If the thickness of the heat shield is to vary over a large surface area, different size layers of the net fabric can be built up, starting with smaller sheets in contact with the substructure where the buildup is to be the thickest, and increasing the size of the fabric gradually until the outer fabric is one continuous layer, in order to attain maximum integrity of the part being fabricated.

Further, while the heat shield has been described and illustrated as being secured to the bulkhead of a spacecraft, it should be understood, of course, that the heat shield could be secured to other surfaces such as cylindrical or conical shaped surfaces where heat shields are needed.

Figure 6:
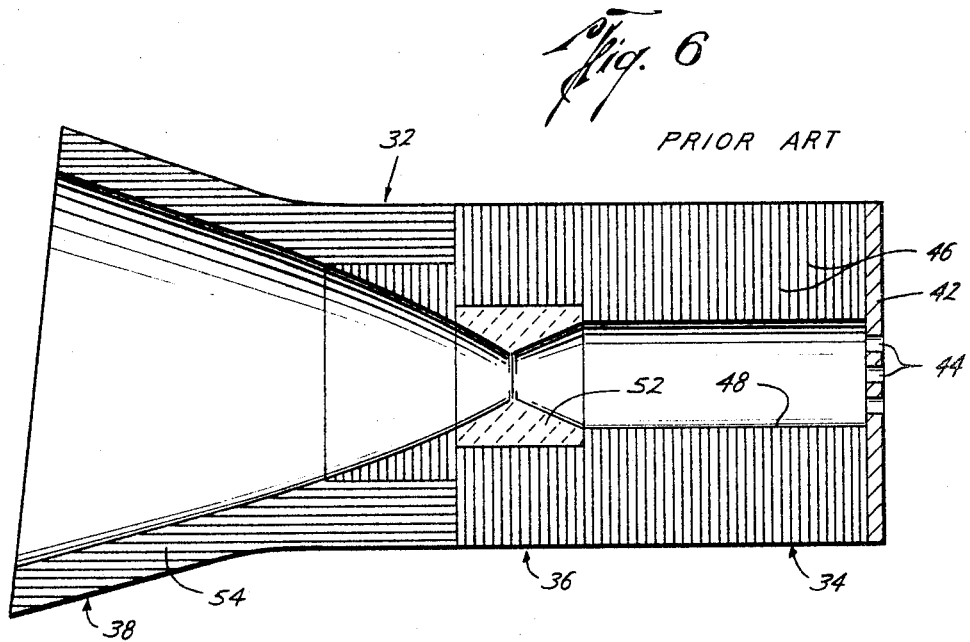
FIG. 6 is a side view in section of the prior art rocket engine.

Referring now to FIG. 6, there is shown a prior art rocket engine 32 formed of ablative material. The engine comprises a combustion chamber portion 34, a nozzle portion 36, and an exhaust portion 38. Secured to one end of the combustion chamber portion 34 is an injector head 42 having holes 44 therein for injecting propellant into the combustion chamber portion 34. The combustion chamber portion is formed of a plurality of annular disks 46 having an opening 48 therein. The openings are made to gradually increase at the nozzle portion 36 and fit over a standard throat insert 52 made of refractory material in the nozzle portion. Then the inner opening of the engine flares outwardly to form the exhaust portion 38 so as to allow the combustion gases to expand, thereby providing the thrust of the engine. The exhaust portion of the chamber 38 is formed of laminated layers 54 of ablative material which extends into the chamber at an angle thereto in a manner similar to the shingles of FIG. 2.

Upon heating of the combustion chamber portion 34, ablation of the discs 46 occurs. Due to the discs' radial configuration with respect to the axis of the rocket engine, delamination of the discs may occur. This delamination may result in buckling of the discs with the resultant formation of a path for heat directly to the outer portion of the rocket engine, thus resulting in structural failure of the rocket engine.

Figure 7:
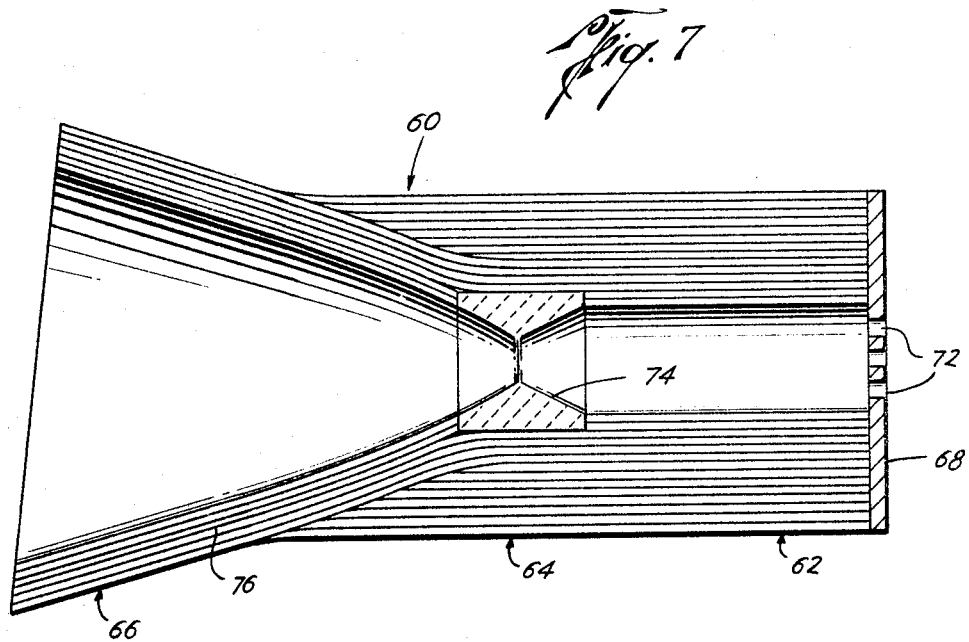
FIG. 7 is a side view in section of a rocket engine embodying the novel ablative material of the present invention.

Referring now to FIG. 7, there is depicted an embodiment of a rocket engine 60 in accordance with the invention. The engine comprises a combustion chamber portion 62, a nozzle portion 64, and an exhaust portion 66. Secured to one end of the combustion chamber portion 62 is an injector head 68 having holes 72 therein which operate in a similar manner to the rocket engine head of FIG. 6. Except for a throat insert 74 of refractory material in the nozzle portion 64, the entire engine is composed of a loose weave mesh cloth 76, or screen material of the type previously depicted in FIGS. 4 and 5 of the drawings. For applications where heat is not present for long durations of time in the engine, it is possible to make the entire rocket engine, including the nozzle portion, entirely of ablative material.

The material 76 is built up into a body of revolution of concentric laminates using a central mandrel to attain the approximate shape of the rocket engine. The fibers comprising the mesh can consist of such reinforcing materials as Fiberglas, high-silica content Fiberglas, asbestos fiber, or fiber made from refractory or ceramic type materials which retain their strength at high temperatures. The material used to bond the fibers and the plies together can consist of the well-known resins which are used in ablative materials such as phenolic, phenosilane, epoxy, and polyester resin.

In the construction disclosed in FIG. 7, the fiber orientation in both the axial and circumferential direction provides both high hoop strength and strength in the axial direction. This construction does not tend to cause delamination as in the embodiment of FIG. 6, and due to the open mesh features of the material, gases are allowed to vent. Further, since the heat transfer rate of the embodiment of FIG. 7 is less in the radial direction of the rocket engine than the embodiment of FIG. 6, due to the tendency of the heat to follow the direction of the fibers, a reduced thickness and lighter engine can be used.

While the invention has been depicted for use in heat shields and rocket engines, it is apparent to those skilled in the art that other components could be manufactured where ablative material is required without departing from the scope of the invention.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A heat protective structure for use as a heat shield secured to a spacecraft wherein substantial amounts of heat will be created and transferred to said spacecraft comprising:
   an outer layer forming a surface exposed to said heat;
   a plurality of inner layers arranged substantially parallel to and integrally formed with said outer layer;
   means in each of said layers for allowing gases generated upon heating of said structure to readily vent towards said exposed surface comprising threads of fiber disposed in criss-cross fashion and defining a plurality of cells, the spacing between adjacent threads being several times greater than the thickness of said threads; and ablation material impregnated in the cell area between the threads of each layer and the area between the threads of successive layers.

2. A heat protective structure for use as a heat shield secured to a spacecraft wherein substantial amounts of heat will be created and transferred to said spacecraft comprising:
an outer layer forming a surface exposed to said heat;
a plurality of inner layers arranged substantially parallel to and integrally formed with said outer layer;
means in each of said layers for allowing gases generated upon heating of said structure to readily vent towards said exposed surface comprising threads of fiber forming a portion of each of said layers arranged in a cellular fashion, the spacing between adjacent threads being several times greater than the thickness of said threads; and
ablation material impregnated in the cell area between the threads of each layer and the area between the threads of successive layers.

3. An ablation structure forming a rocket engine, said rocket engine having a combustion chamber portion, a nozzle portion, and an exhaust portion, said engine comprising:
a surface layer exposed to heat in said rocket engine and forming the inner surface of said rocket engine;
a plurality of outer layers arranged as a body of revolution with respect to said inner surface layer and integrally formed therewith;
means for allowing gases generated upon heating of said structure to readily vent towards said inner surface comprising threads of fiber disposed in a crisscross fashion and defining a plurality of cells, said fibers being disposed axially and circumferentially to the axis of said rocket engine, the spacing between adjacent threads being several times greater than the thickness of said threads; and
ablation material impregnated in the cell area and in the area between the threads of successive layers.

4. An ablation structure forming a rocket engine, said rocket engine having a combustion chamber portion, a nozzle portion, and an exhaust portion, said engine comprising:
a surface layer exposed to heat in said rocket engine and forming the inner surface of said rocket engine;
a plurality of outer layers arranged substantially parallel to said inner surface layer and integrally formed therewith;
means for allowing gases generated upon heating of said structure to readily vent towards said inner surface comprising threads of fiber arranged in a cellular fashion and disposed axially and circumferentially to said engine axis, the spacing between adjacent threads being several times greater than the thickness of said threads; and
ablation material impregnated in the cellular area and in the area between the threads of successive layers.

5. An ablation structure forming a rocket engine, said rocket engine having a combustion chamber portion, a nozzle portion, and an exhaust portion said engine comprising:
a surface layer exposed to heat in said rocket engine and forming the inner surface of said rocket engine;
a plurality of outer layers arranged substantially parallel to said inner surface layer and integrally formed therewith;
means for allowing gases generated upon heating of said structure to readily vent towards said surface layer comprising threads of fiber arranged in a cellular fashion, the spacing between adjacent threads being several times greater than the thickness of said threads; and
ablation material impregnated in the cell area and in the area between the threads of successive layers.

6. An ablation structure for use where substantial amounts of heat will be created comprising:
a layer forming a surface exposed to said heat;
a plurality of sublayers arranged substantially parallel to and integrally formed with said surface layer;
means for allowing gases generated upon heating of said structure to readily vent towards said exposed surface, each of said layers containing a fibrous material having threads disposed in cellular fashion with the space between adjacent threads being several times greater than the thickness of said threads; and
ablation material impregnated in the cellular area between the threads of each layer and the area between threads of successive layers.

References Cited by the Examiner

UNITED STATES PATENTS

| 3,022,190 | 2/1962 | Feldman | 60—35.6 |
| 3,026,806 | 3/1962 | Runton et al. | 103—92.5 |

References Cited by the Applicant

UNITED STATES PATENTS

| 2,835,107 | 5/1958 | Ward. |
| 3,023,135 | 2/1962 | Wiltshire. |
| 3,074,111 | 1/1963 | Wiltshire. |
| 3,081,705 | 3/1963 | Warnken. |
| 3,082,134 | 3/1963 | Wentz. |
| 3,115,271 | 12/1963 | Anderson et al. |
| 3,115,988 | 12/1963 | Warnken. |
| 3,130,940 | 4/1964 | Erb et al. |

MARK NEWMAN, *Primary Examiner.*

C. R. CROYLE, *Assistant Examiner.*